US009506486B2

(12) United States Patent
Stieler

(10) Patent No.: US 9,506,486 B2
(45) Date of Patent: Nov. 29, 2016

(54) FASTENING ARRANGEMENT, PORTABLE WORKING TOOL AND METHOD OF FASTENING A FIRST HOUSING SECTION TO A SECOND HOUSING SECTION

(71) Applicant: MAKITA CORPORATION, Aichi (JP)

(72) Inventor: Eik Stieler, Brunsbek (DE)

(73) Assignee: MAKITA CORPORATION, Aichi (JP)

( * ) Notice: Subject to any disclaimer, the term of this patent is extended or adjusted under 35 U.S.C. 154(b) by 79 days.

(21) Appl. No.: 14/556,773

(22) Filed: Dec. 1, 2014

(65) Prior Publication Data

US 2015/0152901 A1  Jun. 4, 2015

(30) Foreign Application Priority Data

Dec. 2, 2013 (DE) .................... 20 2013 105 469 U

(51) Int. Cl.
*F16B 37/08* (2006.01)
*F16B 5/02* (2006.01)
*B25F 5/02* (2006.01)
*F16B 33/00* (2006.01)

(52) U.S. Cl.
CPC . *F16B 5/02* (2013.01); *B25F 5/02* (2013.01); *F16B 33/00* (2013.01); *Y10T 29/49948* (2015.01)

(58) Field of Classification Search
CPC .......... F16B 5/02; F16B 33/00; F16B 33/02; F16B 37/00; F16B 37/14; F16B 37/145; F16B 37/08; B25F 5/02
USPC .................................. 411/432, 436
See application file for complete search history.

(56) References Cited

U.S. PATENT DOCUMENTS

| | | | | | |
|---|---|---|---|---|---|
| 5,244,290 | A | * | 9/1993 | Chi ........................ | B62K 21/18 403/24 |
| 5,350,266 | A | * | 9/1994 | Espey ...................... | B62J 23/00 403/375 |
| 5,692,865 | A | * | 12/1997 | Pratt ....................... | A43C 15/02 403/370 |
| 5,961,266 | A | * | 10/1999 | Tseng ...................... | F16B 37/12 411/289 |
| 6,053,683 | A | * | 4/2000 | Cabiran .................. | F16B 37/14 411/372.6 |

(Continued)

FOREIGN PATENT DOCUMENTS

| | | |
|---|---|---|
| DE | 101 24 080 | 2/2002 |
| DE | 10 2006 037 329 | 2/2008 |

(Continued)

OTHER PUBLICATIONS

Search report from German Search Report Appl. No. 202013105469, mail date is Jul. 18, 2014.

*Primary Examiner* — Roberta Delisle
(74) *Attorney, Agent, or Firm* — Greenblum & Bernstein, P.L.C.

(57) ABSTRACT

A fastening arrangement for fastening a first housing section to a second housing section of a portable working tool as well as a method by means of which the connection of two housing sections to each other can be simplified are disclosed. A working tool is proposed with a bolt, which at least in sections has an external thread, an internal nut, which at least in sections has an internal thread, wherein the internal thread of the internal nut engages in the external thread of the bolt, and an external nut, which is connected to the internal nut in such a way that the internal nut is held in a displaceable manner in the external nut, whereby during a rotational movement of the external nut the internal nut follows the rotational movement of the external nut and the internal nut performs an axial movement relative to the external nut.

14 Claims, 3 Drawing Sheets

(56) References Cited

U.S. PATENT DOCUMENTS

| | | | | |
|---|---|---|---|---|
| 6,357,953 | B1 * | 3/2002 | Ballantyne | F16B 5/0233 403/365 |
| 6,789,993 | B2 * | 9/2004 | Ozawa | F16B 5/0233 411/432 |
| 7,896,595 | B2 * | 3/2011 | Case | F16B 37/14 411/128 |
| 8,202,033 | B2 * | 6/2012 | Choi | B62D 25/147 411/535 |
| 8,520,358 | B2 * | 8/2013 | Bessho | B64D 45/02 361/218 |
| 8,864,432 | B2 * | 10/2014 | Figge | F16B 5/025 411/383 |
| 9,051,962 | B2 * | 6/2015 | Schermer | F16B 41/005 |

FOREIGN PATENT DOCUMENTS

| | | |
|---|---|---|
| WO | 2004/078434 | 9/2004 |
| WO | 2004/091873 | 10/2004 |

* cited by examiner

FASTENING ARRANGEMENT, PORTABLE WORKING TOOL AND METHOD OF FASTENING A FIRST HOUSING SECTION TO A SECOND HOUSING SECTION

DESCRIPTION

The present invention relates to a fastening arrangement for fastening a first housing section to a second housing section of a portable working tool. The invention also relates to a portable working tool with such a fastening arrangement. The invention also relates to a method of fastening a first housing section to a second housing section of a portable working tool.

PRIOR ART

From DE 10 2006 037 329 A1 a manually-operated, motor-driven chain saw is known which has a housing and a housing cover, wherein the housing cover is attached to the housing by means of at least one fastening arrangement. The fastening arrangement has a stud bolt and a nut. The stud bolt is attached to the housing. The nut is screwed onto the stud bolt on the outside of the housing cover so that the nut presses the housing cover against the housing, wherein the guide bar of the chain saw is clamped between the housing cover and the housing. In the assembled, ready-to-use state, the stud is passed through the side wall of the housing cover to the outside thereof. The nut is screwed onto the threaded end of the stud blot. After partial loosening of the nut an adjusting screw can be operated through an adjustment opening in the housing cover and the tension of the chain attached to the guide bar can be corrected After completely unscrewing the nut the housing cover can be removed from the housing which allows disassembly or replacement of the guide bar.

DESCRIPTION OF THE INVENTION: AIM, SOLUTION, ADVANTAGES

The aim of the present invention is to provide a portable working tool as well as a method by means of which the assembling of two housing sections to each can be facilitated.

This aim is achieved with the features of the independent claims. Advantageous further developments of the invention are set out in the dependent claims.

The fastening arrangement in accordance with the invention comprises a bolt, an internal nut and an external nut. The bolt has, at least in sections, an external thread and the internal nut has, at least in sections, an internal thread, whereby the internal thread of the internal nut engages in the external thread of the bolt. The external nut is connected to the internal nut in such a way that the internal nut is held in the external nut in a displaceable manner, whereby during a rotational movement of the external nut the internal nut performs an axial movement relative to the external nut along a longitudinal axis of the bolt.

On the one hand the fastening arrangement is characterised in that the individual components of the fastening arrangement are connected to each other in such a way that a loss of the individual components of the fastening arrangement during the assembly or dismantling process can be prevented. As a result of this, the assembly of housing sections can be simplified/improved as the handling of the fastening arrangement can be facilitated for a user.

The bolt has an external thread which can extent over the entire length of the bolt but also just along one section of the length of the bolt. The internal nut, which is of a sleeve-like design, is screwed onto the bolt in that the internal nut has an internal thread which engages in the external thread of the bolt. The internal thread of the internal nut preferably extends over the entire length of the internal nut, whereby, however, it is also possible for the internal thread only to be formed along one section of the length of the internal nut. In turn, the external nut of the fastening arrangement is arranged on the outer circumferential surface of the internal nut so that the internal nut is positioned between the external nut and the bolt. The internal nut is arranged with its outer circumferential surface on the inner circumferential surface of the external nut in such a way that the internal nut can be moved relative to the bolt along the longitudinal axis of the bolt/the external nut. Through this coupling of the internal nut with the external nut, and the engagement of the internal nut in the external thread of the bolt, it can be achieved that during a rotational movement of the external nut the internal nut also performs a rotational movement in that the torque applied by a user to the external nut is transmitted to the internal nut, and in addition to the rotational movement of the internal nut, the internal nut also undergoes a longitudinal movement/longitudinal displacement along the longitudinal axis of the bolt. Through the longitudinal movement/longitudinal displacement of the internal nut relative to the external nut and relative to the bolt, the height of the internal nut relative to the height of the external nut and the bolt can be changed, wherein the external nut and the bolt preferably cannot be changed in terms of their height relative to each other. In this way it is possible that when the housing sections are not fastened to each other, the internal nut projects beyond the external nut and the bolt, and on changing from a state in which the housing sections not be fastened to each other to a state in which they are fastened to each other, the internal nut is moved, preferably turned, into an intermediate space between the external nut and the bolt, so that in the fastened state the internal nut preferably no longer projects beyond the external nut and the bolt, but preferably ends flush with the external nut and the bolt. During disassembly and thereby changing from the fastened stated to the non-fastened state it is sufficient for the user to apply a torque to the external nut which is transmitted by the external nut to the internal nut, so that through the rotational movement and the simultaneous longitudinal displacement the internal nut is moved, preferably turned, back out of the intermediate space between the external nut and the bolt.

Through this embodiment of the fastening arrangement in accordance with the invention, the assembly and the disassembly of housing sections can be simplified and also carried out more safely. Furthermore, the fastening arrangement can be designed to be particularly compact and thereby space-saving. Also, the number of components necessary for creating the fastening arrangement can be reduced compared with conventional fastening arrangements.

In order to be able to achieve that a torque applied to the external nut can be transmitted to the internal nut and therefore that the internal nut follows the rotational movement of the external nut, it is preferably envisaged that the internal nut is positively connected to the external nut.

The positive connection can preferably be designed as a groove-spring connection. Through the groove-spring connection a coupling of the internal nut with the external nut can be achieved in which the internal nut can be displaced relative to the external nut in the longitudinal direction of the external nut/the internal nut, but a rotational movement of the internal nut relative to the external nut can be prevented. By means of the groove-spring connection the internal nut can thereby be specifically guided by the external nut in an assembly or disassembly process. The groove-spring connection can, for example, be achieved through the provision of one or more ribs or bars and one or more grooves, wherein in each case one rib/bar can engage in one groove. The ribs/bars and the grooves are preferably aligned in parallel to the longitudinal axis of the internal nut/the external nut. For example, on the outer circumferential surface of the internal nut one or more ribs can be formed and on the inner circumferential surface for the external nut one or more grooves. However, it is also possible for one or more ribs to be formed on the inner circumferential surface of external nut and one or more grooves on the outer circumferential surface of the internal nut. A mixed arrangement is also possible so that grooves and ribs can be formed both on the internal nut and the external nut.

The positive connection can also be designed in such a way that the internal nut has an outer polygonal profile, and the external nut has an inner polygonal profiled, for example an inner hexagonal profile, wherein the inner polygonal profile positively engages in the outer polygonal profile, but at the same time a displacement between the outer polygonal profile and the inner polygonal profile and thereby the internal nut relative to the external nut is made possible. Other embodiments of positive connections that prevent a rotational movement of the internal nut relative to the external nut, but allow a displacement movement of the internal nut relative to the external nut are also possible.

A further preferred embodiment of the fastening arrangement envisages that the external nut has a stop formed on an inner circumferential surface of the external nut and the internal nut has a counter-stop formed on an outer circumferential surface of the internal nut, wherein, by way of the stop and the counter-stop the internal nut is held in a loss-proof manner in an internal space of the external nut. By means of the stop and the counter-stop unwanted detachment of the internal nut from the external nut can be prevented. More particularly, by means of the stop and the counter-stop the displacement path of the internal nut relative to the external nut can be restricted. The stop can be, for example, in the form of a step or projection formed on the inner circumferential surface of the external nut. The counter-stop can, for example, also be in the form of a step or a projection formed on the outer circumferential surface of the internal nut. Both the stop and the counter-stop can be designed annularly over the entire inner circumferential surface of the external nut or the outer circumferential surface of the internal nut. However, the stop and the counter-stop can also only be formed on a partial section of the inner circumferential surface of the external nut or the outer circumferential surface of the internal nut.

The external nut can also have a projection formed on an outer circumferential surface of the external nut by means of which the external nut can fastened to the first or the second housing section. The external nut, which with its outer circumferential surface is in direct contact with one of the two housing sections, can be securely held in the relevant housing section by means of the projection so that unwanted detachment of the external nut from the relevant housing section, particularly during a rotational movement of the external nut, can be prevented. The projection can be annularly formed on the outer circumferential surface of the external nut, but can also only extend over a limited section of the outer circumferential surface of the external nut.

In order to facilitate the handling of the external nut for a user, it can also be advantageously envisaged that the external nut has a tool attachment surface. The tool attachment surface can be designed in the form of a grip surface for a tool, for example a socket wrench, wherein the tool attachment surface, which is preferably provided in an outer circumferential surface of the external nut, can be designed in the form of a polygon, preferably a hexagon. The tool attachment surface can also exhibit knurling or suchlike for manually handling the external nut.

In addition to the bolt, the internal nut and the external nut, the fastening arrangement can also have a press bushing. More particularly, the press bushing can form a secure holder for the internal nut and the external nut within one of the housing sections. For this, the press bushing is pressed into the housing section on which the internal nut and the external nut are assembled after the internal nut and the external nut are already positioned on the relevant housing section. After arrangement of the internal nut and the external nut in the relevant housing section, the press bushing is pressed into the relevant housing section up to a stop. The stop for the press bushing can be formed by the internal nut, whereby for this the internal nut can be held at a defined height in a corresponding pressing device. In this way flush assembly of the press bushing, for example in relation to a contact surface of the guide bar of the working tool can be achieved.

The fastening arrangement designed and further developed as above, can preferably be arranged in a portable working tool, for example a chain saw, but also in other working implements, in that a first housing section is fastened to a second housing section of the working tool by means of the fastening arrangement. If the working tool is a chain saw, the first housing section can, for example, be designed as a chain wheel cover, and the second housing section, as a main housing, for example, in which the motor of the working tool is arranged.

In addition, the aim in accordance with the invention is achieved with a method of fastening a first housing section to a second housing section in which an internal nut, which at least in sections has an internal thread, is connected to a bolt, which at last in sections has an external thread, in such a way that the internal thread of the internal nut engages in the external thread of the bolt, and the internal nut is connected to an external nut in such a way that the internal nut is held in the external nut in a displaceable manner, whereby during a rotational movement of the external nut, the internal nut follows the rotational movement of the external nut and the internal nut performs and axial movement relative to the external nut along a longitudinal axis of the bolt.

BRIEF DESCRIPTION OF THE DRAWINGS

Further measures improving the invention are set out below along with the description of a preferred example of embodiment of the invention with the aid of the figures, wherein.

PREFERRED FORMS OF EMBODIMENT OF THE INVENTION

Figure 1:
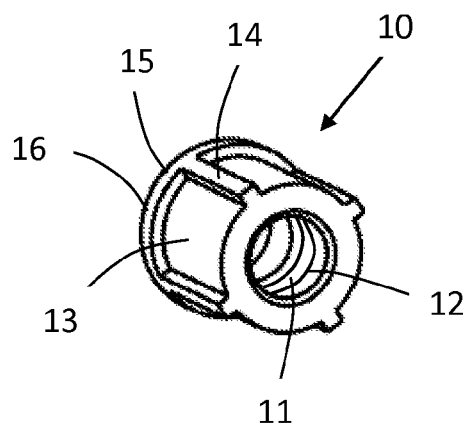
FIG. 1 shows schematic view of an internal nut of a fastening arrangement in accordance with the invention.
Figure 4:
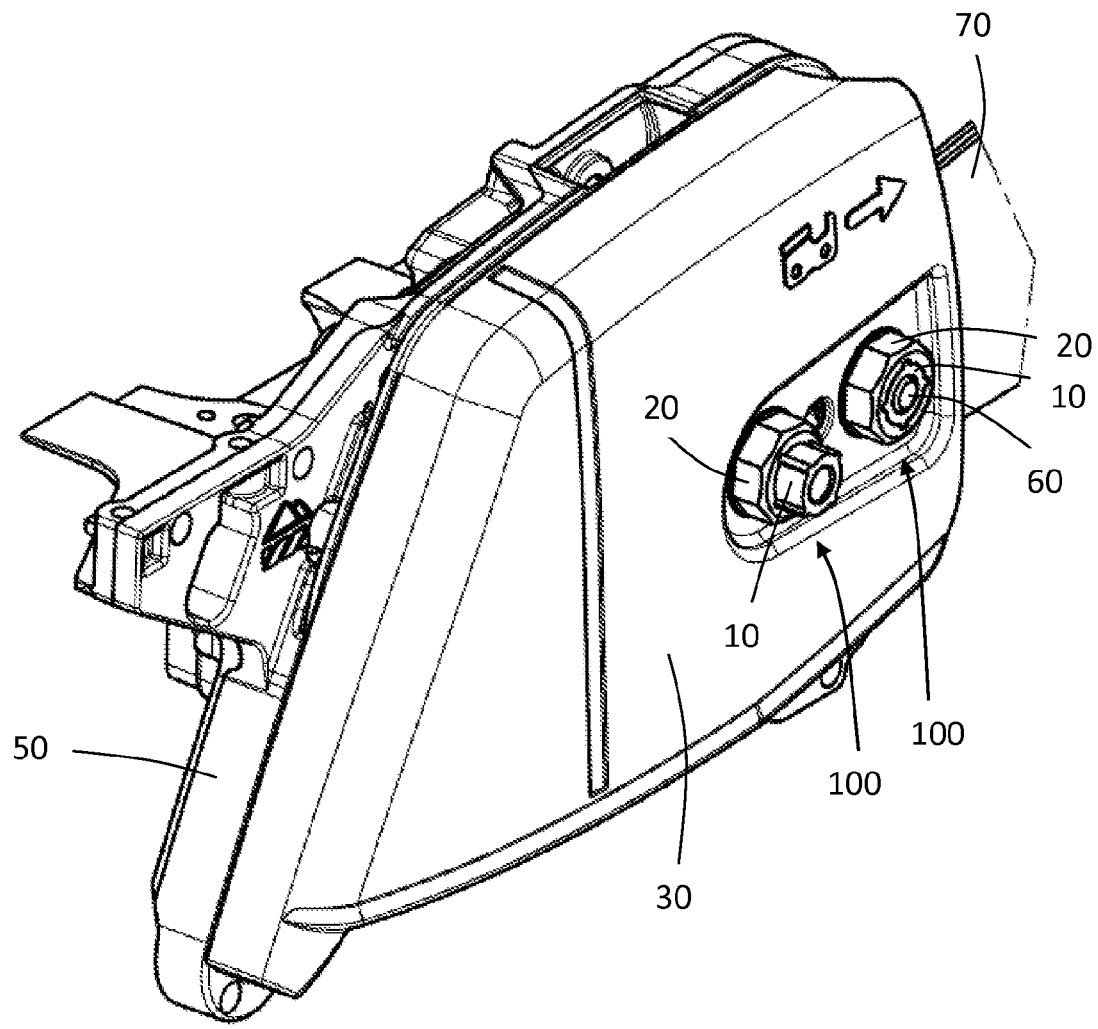
FIG. 4 shows a schematic view of two fastening arrangements in accordance with the invention arranged on two housing sections to be fastened to each other, whereby the two fastening arrangements are shown in two different fastening states.

FIG. 1 shows an internal nut 10 of a fastening arrangement 100 as shown in FIG. 4. The internal nut 10 is sleeve-like in design and on its inner circumferential surface 11, at least in sections, has an internal thread 12.

On its outer circumferential surface 13 the internal nut 10 has several ribs 14 or bars, in this case four ribs 14 which are arranged at a distance from each other along the outer circumferential surface 13 of the internal nut 10. The ribs 14 extend axially and thus in the longitudinal direction, in parallel to the longitudinal axis of the internal nut 10.

Also on the outer circumferential surface 13 of the internal nut 10 a counter-stop 15 is provided which is designed in the form of a projection or a stop and projects from the outer circumferential surface 13 of the internal nut 10. In the embodiment shown here, the counter-stop 15 annularly surrounds the outer circumferential surface 13 of the internal nut 10. The counter-stop 15 is arranged on an end section 16 of the internal nut 10.

In the embodiment shown here, the ends of the ribs 14 directly adjoin the counter-stop 15 and merge into it.

The internal nut 10 can be made of a metal or also of a plastic material.

Figure 2:
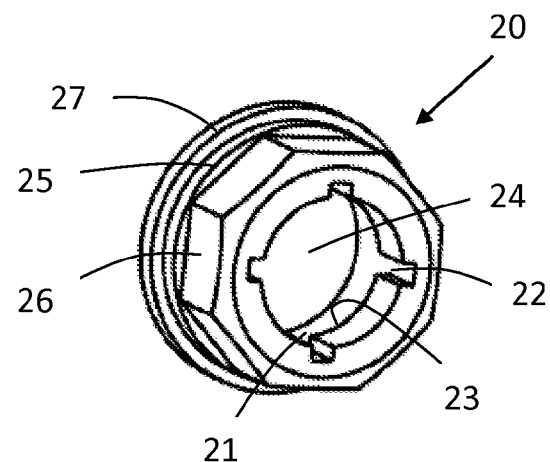
FIG. 2 shows a schematic view of an external nut of the fastening arrangement in accordance with the invention.

FIG. 2 shows an external nut 20 of a fastening arrangement 100 as shown in FIG. 4. On its inner circumferential surface 21 the external nut 20 has several grooves 22, here four grooves 22, at a distance from one another, wherein in an arrangement of the external nut 20 coaxially with the internal nut 10 the ribs 14 of the internal nut 10 can enter the grooves 22 of the external nut 20 in order to form a groove-spring connection between the internal nut 10 and the external nut 20. The grooves 22 extend axially and thus in the longitudinal direction, in parallel to the longitudinal axis of the external nut 20. Through the groove-spring connection between the internal nut 10 and the external nut 20 an axially displaceable positioning of the internal nut 10 on the external nut 20 is possible, whereby at the same time a rotational movement of the internal nut 10 relative to the external nut 20 can be prevented. On the other hand by means of the positive groove-spring connection a torque can be transmitted from the external nut 20 to the internal nut 10 so that the internal nut 10 can follow the rotational movement of the external nut 20.

Furthermore, on the inner circumferential surface 21 of the external nut 20 a stop 23 is provided in the form of a projection or a stop, which projects from the inner circumferential surface 21 of the external nut 20. In the embodiment shown here the grooves 22 are provided within the projections forming the stop 23, so that the stop 23 arranged annularly on the inner circumferential surface 21 of the external nut 20 has several interruptions which are formed by the grooves 22. If the internal nut 10 is arranged in the internal space 24 of the external nut 20 bordered by the inner circumferential surface 21 of the external nut 20, the stop 23 of the external nut 20 acts together the counter-stop 15 of the internal nut 10 in such a way that the internal nut 10 is held in a loss-proof manner in the internal space 24 of the external nut 20.

On its outer circumferential surface 25 the external nut 20 has a tool attachment surface 26 and an annular projection 27 formed adjacent to the tool attachment surface 26. In this case the working tool attachment surface 26 is designed as hexagon. The projection 27, which has a larger outer diameter than the tool attachment surface 26 and thus projects further from the outer circumferential surface 25 of the external nut 20 than the tool attachment surface 26, serves to fasten, more particularly hook, the external nut 20 within a housing section 30, as shown for example in FIG. 2.

The external nut 20 can be made of a metal or also of a plastic material.

Figure 3:
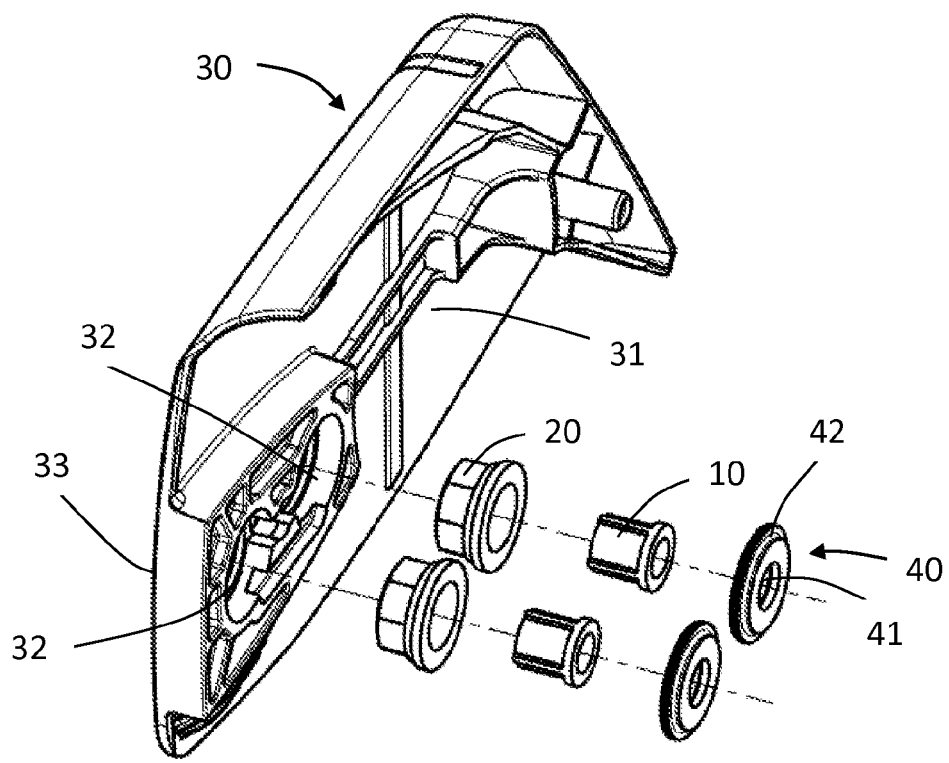
FIG. 3 shows a schematic exploded view of a housing section with an internal nut as shown in FIG. 1, an external nut as shown in FIG. 2 and a press bushing in accordance with the invention.

FIG. 3 shows an exploded view of an external nut 20, an internal nut 10, a press bushing 40 and a housing section 30, on which the internal nut 10, the external nut 20 and the press bushing 40 are assembled.

The housing section 30, which can be made of a metal or a plastic material, is in this case designed as a housing cover, more particularly a chain wheel cover. The internal nut 10, the external nut 20 and the press bushing 40 are assembled on the housing section 30 via the inner side 31 of the housing section 30. The inner side 31 of the housing section 30 is the side of the housing section 30 with which the housing section 30 is fastened to another housing section 50, as shown in FIG. 4. For each fastening arrangement 100, the housing section 30 has a through opening 32 within which the internal nut 10, the external nut 20 and the press bushing 40 are assembled. The embodiment shown here, as also seen in FIGS. 4 and 5, two fastening arrangements 100 are attached to the housing sections 30, 50 next to each other.

The press bushing 40 can be plate-shaped, and has a through opening 41 and an offset 42 formed annularly around the through opening.

Before the two housing sections are connected to each other, the internal nut 10, the external nut 20 and the press bushing 40 are initially assembled on the housing section 30. First of all the internal nut 10 and the external nut 20 are passed so far through the through opening 32 from the inner side 31 in the direction of the outer side 33 of the housing section 30 until the projection 27 of the external nut 20 comes into contact with the housing section 30 as the diameter of the through opening 32 is smaller than the diameter of the projection 27. During this the internal nut 10 is pushed into the internal space 24 of the external nut 20 whereby the ribs 14 and the grooves 22 act as a guide. Once the internal nut 10 and the external nut 20 have been inserted/positioned into/in the housing section 30, the press bushing 40 is pressed into the housing section 30 by way of a pressing device until the press bushing 40 comes into contact with the internal nut 10, which is held at a defined height in the through opening 32. By way of the pressed-in press bushing 40 the internal nut 10 and the external nut 20 are securely held within the through opening 32 of the housing section 30.

Figure 5:
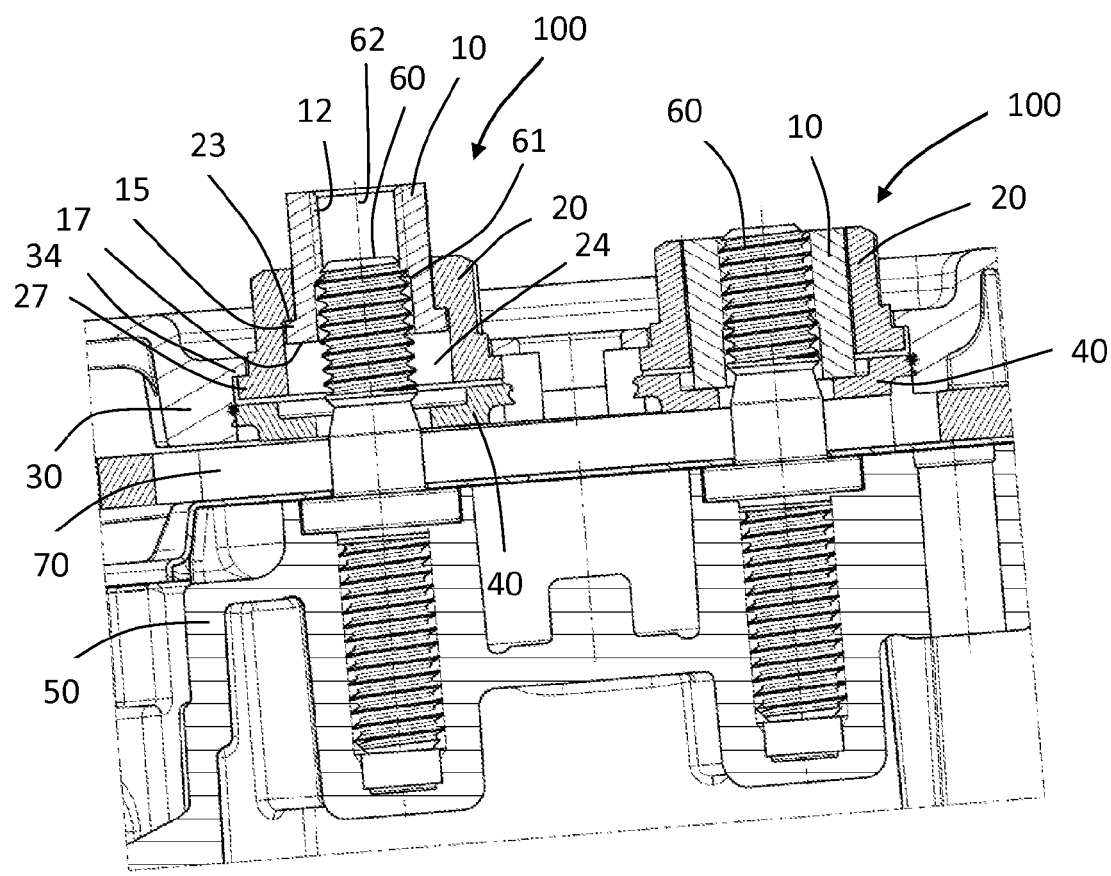
FIG. 5 shows a schematic cross-section of the set-up shown in FIG. 4.

As shown in FIGS. 4 and 5, a bolt 60 is attached to the other housing section 50. When assembling the housing section 30 to the housing section 50 the bolt 60 is also passed through the through opening 32, whereby this takes place in that the internal nut 10 is screwed with its internal thread 12 onto the external thread 61 of the bolt 60.

In FIGS. 4 and 5 the fastening arrangement is shown in two different fastening states, where in the case of the fastening arrangement shown on the left in FIGS. 4 and 5 the two housing sections 30, 50 are not yet firmly assembled, whereas in the case of the fastening arrangement shown on the right in FIGS. 4 and 5 the housing sections 30, 50 are firmly fastened to each other.

If the housing section 30 is placed on the housing section 50 and the bolt 60 attached to the housing section 50 is passed through the through opening 32 of the housing section 30, through the bolt 60 the internal nut 10, initially within the external nut 20, is pushed outwards so that the internal nut 10 projects beyond the external nut 20 as shown in FIGS. 4 and 5 in the depiction of the fastening arrangement 100 on the left. Through the displacement movement towards the outside of the internal nut 10 relative to the external nut 20, the housing section 30 can be positioned up to the guide bar 70 which is held on the housing section 50 without the external nut 20 and the internal nut 10 having to be tightened. The internal nut 10 is pushed so far out of the external nut 20 until the counter-stop of the internal nut 10 comes into contact with the external nut 30 as can be seen from the fastening arrangement 100 shown on the left in FIG. 5. In this way guiding or pushing the internal nut 100 too far out and thereby detachment of the internal nut 10 from the external nut 20 can be prevented. The external nut 20 is immovably arranged in the axial direction within the housing section 30, wherein the external nut 20 is held in the housing section 30 by a stop 34, in the form of a step in the region of the through opening 32, in that the projection is in contact with the stop 34 of the housing section 30 on the outer circumferential surface 25 of the external nut 20.

In order to transfer the fastening arrangement 100 from the unassembled/unfastened state shown on the left in FIGS. 4 and 5 into the assembled/fastened state shown on the right in FIGS. 4 and 5, a torque is applied to the external nut 20 by way of a tool, for example a socket wrench, or manually. If a tool is used, this engages on the tool attachment surface 26 of the external nut 20. The torque applied to the external nut 20 is transmitted to the internal nut 10 via the groove-spring connection between the external nut 20 and the internal nut 10.

The stop 23 on the inner circumferential surface 21 of the external nut 20 and/or the projection 27 on the outer circumferential surface 25 of external nut 20 and/or the internal space 24 of the external nut 20 are preferably designed/dimensioned in such a way during a rotational movement of the external nut 20 through the application of a torque, the housing section 30 is only just not pressed onto the guide bar 70. As result, during assembly pressure can be exerted on the internal nut 10 and the external thread 61 of the bolt 60 can engage in the internal thread 12 of the internal nut 10.

Through the transmission of the torque from the external nut 20 to the internal nut 10, the internal nut 10 follows the rotational movement of the external nut 20. At the same time as the rotational movement of the internal nut 10, through the engaging of the internal thread 12 of the internal nut 10 in the external thread 61 of the bolt 60, the internal nut 10 also performs an axial movement along the longitudinal axis 62 of the bolt 60 so that the internal nut 10 is moved, more particularly turned, on the bolt 60 in the direction of the guide bar 70, whereby the internal nut 10 is moved into the internal space 24 of the external nut 20, preferably until the internal nut 10 no longer projects beyond the external nut 20 as shown in the fastening arrangement seen on the right in FIGS. 4 and 5.

When the internal nut 10 reaches the press bushing 40, i.e. the face end 17 of the internal nut 10 comes into contact with the press bushing 40, the housing section 30 is pressed onto the guide bar 70. At this point the internal nut 10 no longer has to carry out an axial movement and the friction of the groove-spring connection no longer has to be overcome. Therefore, as of this time the entire torque applied to the external nut 20 and thereby to the internal nut 10 is now only used for clamping the housing section 30 to the housing section 50 and thereby the guide bar 70 between the two housing sections 30, 50.

During loosening and thus transfer from the assembled/fastened state into the non-assembled/non-fastened state the procedure takes place in reverse. After overcoming an initially high torque, the external nut 20 can, for example, be manually turned until loosening of the clamping. Here, the internal nut 10 again axially moves along the longitudinal axis 62 of the bolt 60 out of the internal space 24 of the external nut 20 until the internal nut 10 projects out of the internal space 24 of the external nut 20. In doing so the internal nut 10 moves so far outwards until the internal thread 12 of the internal nut 10 no longer engages in the external thread 61 of the bolt 60 and the bolt is thereby released so that both housing sections 30, 50 can be separated from one another again.

In its implementation the invention is not restricted to the preferred example of embodiment set out above. Rather, a number of variants are conceivable which make use of the described solutions even with fundamentally different types of embodiment. All features and/or advantages, including design details, spatial arrangements and procedural steps set out in the claims, the description of the drawings can be essential to the invention by themselves or also in the most varied of combinations.

LIST OF REFERENCE NUMBERS 100 fastening arrangement
10 internal nut
11 inner circumferential surface
12 internal thread
13 outer circumferential surface
14 rib
15 counter-stop
16 end section
17 end face
20 external nut
21 inner circumferential surface
22 groove
23 stop
24 internal space
25 outer circumferential surface
26 tool attachment surface
27 projection
30 housing section
31 inner side
32 through opening
33 outer side
40 press bushing
41 through opening
42 offset
50 housing section
60 bolt
61 external thread
62 longitudinal axis
70 guide bar

The invention claimed is:

1. A fastening arrangement for fastening a first housing section to a second housing section of a portable working tool, the fastening arrangement comprising:

a bolt, which at least in sections has an external thread, an internal nut, which at least in sections has an internal thread, wherein the internal thread of the internal nut engages in the external thread of the bolt, and an external nut, which is connected to the internal nut in such a way that the internal nut is held in the external nut in a displaceable manner, wherein, during a rotational movement of the external nut the internal nut follows the rotational movement of the external nut and the internal nut performs an axial movement relative to the external nut along a longitudinal axis of the bolt, wherein the internal nut is configured to protrude from the external nut to provide a free end of the fastening arrangement in a direction of the longitudinal axis of the bolt.

2. The fastening arrangement according to claim 1, wherein the internal nut is positively connected to the external nut.

3. The fastening arrangement according to claim 2, wherein the positive connection is designed as a groove-spring connection.

4. The fastening arrangement according to claim 1, wherein the external nut has a stop formed on an inner circumferential surface of the external nut and the internal nut has a counter-stop formed on an outer circumferential surface of the internal nut, wherein the stop and the counter-stop holds the internal nut in a loss-proof manner in an internal space of the external nut.

5. The fastening arrangement according to claim 1, wherein the external nut has a projection formed on an outer circumferential surface of the external nut such that the external nut can be fastened to the first or the second housing section.

6. The fastening arrangement according to claim 1, wherein the external nut has a tool attachment surface.

7. The fastening arrangement according to claim 1, wherein the fastening arrangement has a press bushing.

8. A portable working tool, with a first housing section and a second housing section, wherein the first housing section is fastened to the second housing section by the fastening arrangement according to claim 1.

9. The fastening arrangement according to claim 1, wherein the internal nut defines a spacer between an inner surface of the external nut and the external thread of the bolt so that the external nut does not contact the bolt.

10. The fastening arrangement according to claim 1, wherein the internal nut is provided with ribs on an outer circumferential surface of the internal nut and the external nut is provided with grooves on an inner circumferential surface of the external nut, the ribs of the internal nut being positioned within and configured to slide along the grooves of the external nut.

11. The fastening arrangement according to claim 10, wherein the ribs of the internal nut and the grooves of the external nut extend in the direction of the longitudinal axis of the bolt.

12. A method of fastening a first housing section to a second housing section of a portable working tool in which an internal nut, which at least in sections has an internal thread, is connected to a bolt, which at least in sections has external thread, in such a way the internal thread of the internal nut engages in the external thread of the bolt and the internal nut is connected to the external nut in such a way that the internal nut is held in the external nut in a displaceable manner, whereby during a rotational movement of the external nut the internal nut follows the rotational movement of the external nut and the internal nut performs an axial movement relative to the external nut along a longitudinal axis of the bolt, wherein the internal nut is configured to protrude from the external nut to provide a free end of the fastening arrangement in a direction of the longitudinal axis of the bolt.

13. A fastening arrangement for fastening a first housing section to a second housing section of a portable working tool, the fastening arrangement comprising:

a bolt, which at least in sections has an external thread, an internal nut, which at least in sections has an internal thread, wherein the internal thread of the internal nut engages in the external thread of the bolt, an external nut, which is connected to the internal nut in such a way that the internal nut is held in the external nut in a displaceable manner, wherein, during a rotational movement of the external nut the internal nut follows the rotational movement of the external nut and the internal nut performs an axial movement relative to the external nut along a longitudinal axis of the bolt, wherein the internal nut is provided with ribs on an outer circumferential surface of the internal nut and the external nut is provided with grooves on an inner circumferential surface of the external nut, the ribs of the internal nut being positioned within and configured to slide along the grooves of the external nut.

14. The fastening arrangement according to claim 13, wherein the ribs of the internal nut and the grooves of the external nut extend in the direction of the longitudinal axis of the bolt.

* * * * *